United States Patent [19]
Dubreucq

[11] 3,881,578
[45] May 6, 1975

[54] APPARATUS FOR BRAKING RAILWAY VEHICLES

[76] Inventor: Yvon Dubreucq, 65, rue Faidherbe, Lesquin, Nord, France

[22] Filed: Nov. 6, 1973

[21] Appl. No.: 413,338

[30] Foreign Application Priority Data
Nov. 10, 1972 France .................. 72.40012
May 15, 1973 France .................. 73.17489
Sept. 13, 1973 France .................. 73.32877

[52] U.S. Cl. .................................... 188/165
[51] Int. Cl. .................................. F16d 65/34
[58] Field of Search ........ 188/33, 41, 59, 158, 164, 188/165, 156; 303/3

[56] References Cited
UNITED STATES PATENTS
| 625,300 | 5/1899 | Heath | 188/165 |
|---|---|---|---|
| 771,193 | 9/1904 | Wells | 188/165 |
| 1,246,257 | 11/1917 | Gelt | 188/165 |
| 2,118,412 | 5/1938 | McCune | 188/165 X |

Primary Examiner—Duane A. Reger
Attorney, Agent, or Firm—Karl W. Flocks

[57] ABSTRACT

A system for braking vehicles moving on rails of magnetic metal and the wheels of which are also of magnetic metal, by way of eddy currents.

At least one magnetic flux is created by means of coils traversed by a direct current, said coils being preferably positioned around the wheels of the vehicle. The magnetic flux is closed from one wheel to the other by the portion of rail comprised between the said wheels after having passed through the contact zones between the wheel and the rail. Eddy currents are thus produced in the bodies of wheels and in the rails, which have a strong braking effect.

6 Claims, 17 Drawing Figures

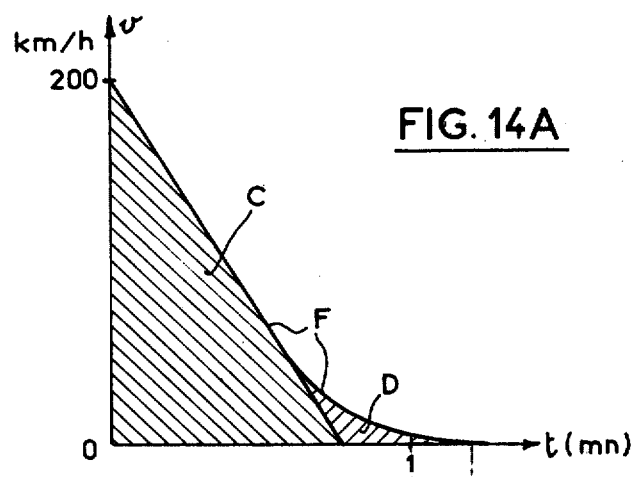
FIG.14A
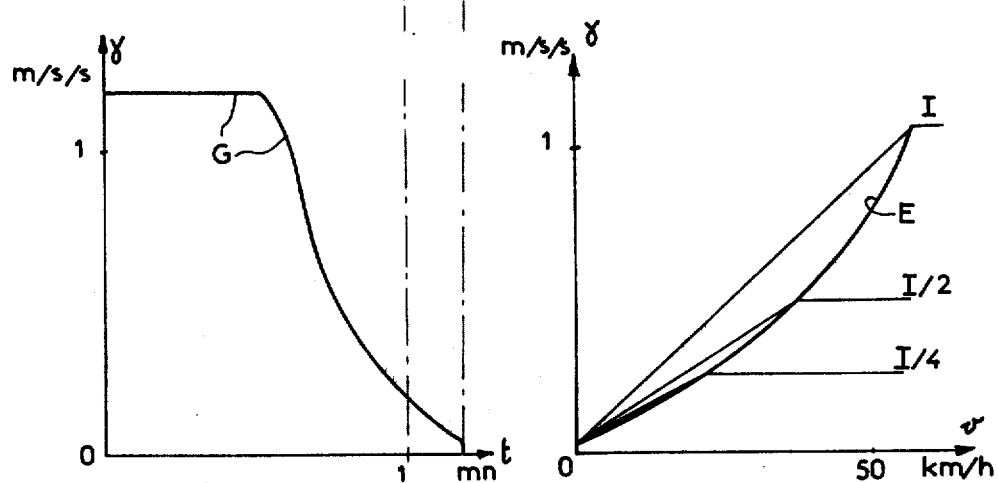
FIG.14B
FIG.15
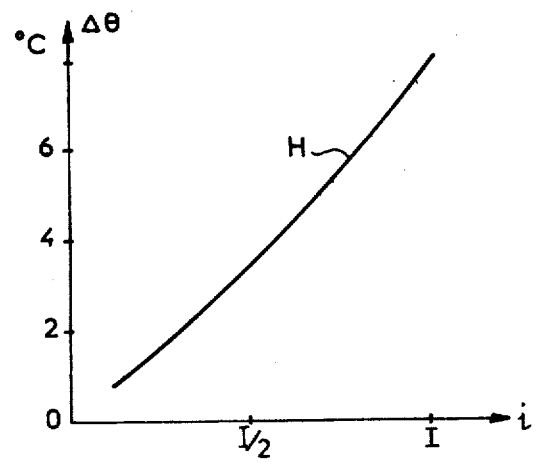
FIG.16

APPARATUS FOR BRAKING RAILWAY VEHICLES

The present invention has for its object a method of and apparatus for braking by eddy currents for vehicles or devices moving on rails or the like of magnetic metal, and the wheels of which are also of magnetic metal.

The present invention has especially for its object to solve the problem of braking railway vehicles by means of a device which is simple and more effective than those known up to the present time.

The device which is most frequently used "the brake-shoe on the wheel," is limited at high speeds by the inacceptable increase in the wear of the shoes and the appearance of thermal fatigue points on the rolling surfaces.

These thermal fatigue points are caused by the amount of heat flux liberated on these surfaces by braking, and the corresponding rise in temperatures. On the other hand, while retaining the maximum coefficient of adhesion between wheel and rail by its self-cleaning effect, the brake-shoe on the wheel is nevertheless limited in its efficiency by this coefficient; the braking force must in fact remain in all cases below the skidding limit, a phenomenon which results in rapid deterioration of the wheels.

Other devices intended to brake the axles without acting directly on the rolling surface, such as disc brakes for example, partly protect the wheel by preventing the hot points at its rolling surface, but always depending on the coefficient of adhesion wheel-rail, they see their effectiveness restricted to a maximum value of deceleration which is practically independent of the mass of the axle to be braked and is in the vicinity of 1 m/sec/sec.

Two other systems, the principle of which is to apply the braking force directly on the rail without passing through the wheel, remedy the disadvantage of the limit of adhesion wheel-rail, but create other difficulties. The first system, which consists of causing the active faces of an electro-magnet to rub against the rail, can hardly be utilized except as emergency braking, since it is subject to heavy wear, and the second which consists of developing eddy currents in the rail by an electro-magnet located just above is very difficult of application by reason of the short distance which it assumes between the active faces and the rail. In fact, the electro-magnets are heavy and must be suspended; they are therefore dependent on the variations of height of the bogey with respect to the rail; if, exceptionally, it were accepted not to suspend them, it would nevertheless be necessary to adapt their height to the wear of the wheels, which would complicate matters considerably.

The combinations of these devices with each other, associated, in the case of driving axles, with the braking by the motor, enable the problems of high speed to be resolved, at the cost however of a considerable complexity of the equipment.

In addition, a system is known which makes it possible to ensure the localized slowing-down of a railway vehicle passing above a section of track equipped for that purpose with an exciting winding mounted on a magnetic transverse element added to the normal ballast and coupling the two rails together.

When a vehicle arrives above the said section of track, the magnetic flux generated by the coil in the transverse element and the rails is then closed by passing through the axles from one wheel to the wheel, keyed on the same axle. This results in a slowing-down effect caused by the eddy currents developed in the wheels and, to small extent, since the flux in them cannot change in direction, in the rails.

It is quite obvious that such a system is only practicable in the case of application to slowing-down waggons in sorting stations, and in no case over the whole of a railway system for braking vehicles under all conditions, since the means to be utilized would then be disproportionate compared with those employed generally on the vehicles.

The present invention has for its object a method of braking by eddy currents of vehicles or devices moving on rails or the like of magnetic metal, and in which the wheels are also of magnetic metal, this method permitting the elimination of the drawbacks of previously known systems while preserving certain of their advantages.

This method is essentially characterized in that at least one magnetic flux is created by means of coils traversed by a direct current and carried on the vehicle, the said magnetic flux being closed from one wheel to the other by the portion of rail comprised between the said wheels after having passed through the contact zones between the wheel and the rail.

The present invention has also for its object an eddy-current braking device for vehicles or devices moving on rails or the like and in which the wheels are also of magnetic metal, which utilizes the above method.

This braking device is essentially characterized in that it comprises at least one excitation coil, preferably at least one excitation coil around each wheel, and at least one induced magnetic circuit comprising at least two wheels located on the same side of the vehicle, the portion of rail comprised between the said wheels and at least one element of magnetic metal carried by the said vehicle closing the said circuit between the said wheels, the said wheels being thus considered as North poles with respect to the said rail in one case and South poles for the other wheel, of an electro-magnet.

By creating a magnetic flux in a circuit such as previously described, eddy currents are produced in the bodies of the wheels and in the rails. These eddy currents have a braking effect, while at the same time a large magnetic attraction, being a function of the magnetic flux intensity and in consequence of the potential braking effect, is developed between the wheels and the rails. This results in an improvement of the rail-wheel adhesion and gives the possibility of a higher deceleration.

In a device according to the present invention, the induced circuit is constituted by magnetic portions already existing on the chassis or bogey and does not result in any additional weight other than that of the windings of conductive metal, this weight being easily suspended while its movements above the rail have no importance.

The present invention makes it possible to find in a single lighter device the advantages of the eddy-current brake acting on the rail (absence of wear, independence with respect to the coefficient of adhesion), while avoiding the difficulties of adjustment of the air-gap above the rails.

It should furthermore be stated that in practice there has been observed during the last few years a continuous increase in the speeds of railway vehicles and an evolution of braking techniques tending to abandon the wheel brake-shoe in favour of the disc-brake. The reasons for this evolution are on the one hand that it is no longer possible without damage to the wheels, to brake with only the wheel shoes from the moment when the speeds exceed 160-180 km/hr for coaches with 12-13 tons per axle, or 120-130 km/hr for waggons with 20 tons per axle, and on the other hand that the wear of the disc-brake linings proves more moderate and the replacements are less frequent than in the case of shoes, giving a gain in profitability of exploitation.

This evolution towards the disc-brake is however accompanied by certain disadvantages.

In fact, the mounting of disc-brakes on a bogey involves an increase in capital cost, which it has been sought to compensate by eliminating either partly or wholly the brakeshoe. Unfortunately, it becomes necessary to utilize expensive anti-skid or anti-slip apparatus conjointly with the disc-brakes in order to utilize their braking possibilities to the best effect.

This is the general case for high speeds, in which, in order to observe the necessary distances between signalling sections, it is necessary to brake practically to the limit of adhesion, which furthermore is better with brake-shoes.

On the other hand, the mounting of disc-brakes results in an increase in the non-suspended weight of the bogeys, this increase adversely affecting the behaviour of the tracks and the stability of the bogeys.

In addition, the stopping distances obtained in use with braking by discs are less uniform than those obtained by braking with wheel-shoes and depend, sometimes to a large extent, on climatic conditions.

The maintenance of disc-brakes is considerably complicated by the fact that the lined shoes of the jaws are less visible and accessible than the wheel-shoes. In addition, when the speeds exceed a certain critical threshold value, in the vicinity of 200 km/hr for carriages, the wear of the disc-brake linings increases abruptly, the frequency and the cost of maintenance become prohibitive and it is necessary to utilize supplementary braking means.

The present invention enables this problem to be resolved in that it permits the retention of the advantages of the disc-brake and diminishes the drawbacks, in particular as regards the cost of investment and exploitation, while providing more regular braking performances and a reduction of the non-suspended weight.

In accordance with the invention, a dynamic braking device using eddy currents without air-gap such as previously defined is combined, by means of an appropriate device for the distribution of the respective braking orders with a system of a friction disc-brake with fluid emission of a type known per se.

The order-distribution device is designed in such manner as to cause the dissipation of the greater part of the braking energy by the dynamic braking device without air-gap, and so as to ensure the end of braking when the dynamic device becomes less effective, by the system of disc-brakes. Thus, the main braking is ensured by the dynamic brake without air-gap which is regular and operates without wear, its control is effected simply by acting on the excitation current of the winding which may be supplied by the kinetic energy of the vehicle through the intermediary of rotary machines such as alternators driven by the axles with a system of current regulation and rectifiers.

The discs of the brakes from which it is no longer demanded to dissipate the greater portion of the energy may be reduced in weight and the clamping force of the jaws may be maintained sufficiently below the limit of adhesion to be able to dispense with an anti-skid device. The wear of the linings being thus considerably reduced, the maintenance visits may be less frequent and the costs are thereby reduced.

It has previously been seen that the dynamic braking device by eddy currents preferably comprised at least one excitation winding around each wheel.

In practice, these excitation windings are arranged around the lower parts of the wheels. In fact, during tests this device has proved to have very advantageous special properties as regards the characteristic of variation of the force as a function of the speed and as regards the efficiency. In fact, for a constant excitation current, the braking force measured on a bogey having its four wheels equipped with windings first increases during a first period, at the same time as the speed, and then at a given speed which only depends on the value of the current, the force becomes stabilized and remains independent of the speed up to very high speeds.

This characteristic may be represented as indicated diagrammatically in FIG. 15 of the accompanying drawings, in which the deceleration has been plotted in ordinates and the speed in abscissae for three values of the excitation current. There has been drawn at E the curve showing the displacement of the single point above which the force no longer depends on the speed.

A characteristic of this kind is very useful since it enables a bogey to be braked from the highest speeds up to stopping by exciting the windings from a source of direct current voltage, without there being any need to modulate the current which remains substantially constant during braking, since the windings heat-up very little. Stopping is effected with an automatic and gradual diminution of the force, which substantially increases the comfort of the passengers as compared with friction devices in which, in the current case of cast-iron brake-shoes for example, the braking force rises when the speed falls up to three times its average value at the moment of stopping, causing a disagreeable shock and a risk of skidding which must be overcome by modulating the force applied to the shoes as a function of the speed.

Another very interesting point of this characteristic is that there is no saturation, that is to say the force continues to increase when the excitation current is increased. This follows from the fact that the magnetic coupling between the ampere-turns of the excitation coil, known as the magnetizing ampere-turns, and the ampere-turns of the eddy-currents, known as secondary or de-magnetizing ampere-turns, is very tight. In fact, the winding is very close to the zones in which the eddy-currents are developed. In the other devices, windings around the axles, for example, the coupling is less close and there is saturation. This tight coupling also gives good efficiency, since all the flux produced by the windings is utilized for the eddy-currents. Thus, the electric excitation power is small and the temperature rise of the windings is also small and even negligible.

According to a characteristic feature of the present invention, there is provided a method of construction of the windings and their fixing means around the wheels in such manner that they may be easily removed while being of the lightest possible construction.

The invention will be better understood from examination of the detailed description which follows below and of the accompanying drawings, which represent, by way of non-limitative examples, several forms of embodiment of the invention;

FIG. 8 is a synoptic diagram of an alternative form of construction of the control device according to the invention, in the case of supply to the windings from a static converter supplied by the high-tension coming from the driving machine, with a battery of accumulators as a stand-by;

FIGS. 14A and 14B are comparative diagrams both showing the reduction of speed and on the other hand the simultaneous variation of the deceleration as a function of the time for braking a normally loaded bogey to a stop, the excitation current being constant;

FIG. 15 shows the system of the deceleration characteristics as a function of the speed for the same bogey and for three values of the excitation current;

FIG. 16 is a diagram showing the temperature rise of the windings during braking to a stop from 200 km/hr, as a function of the excitation current.

Figure 1:
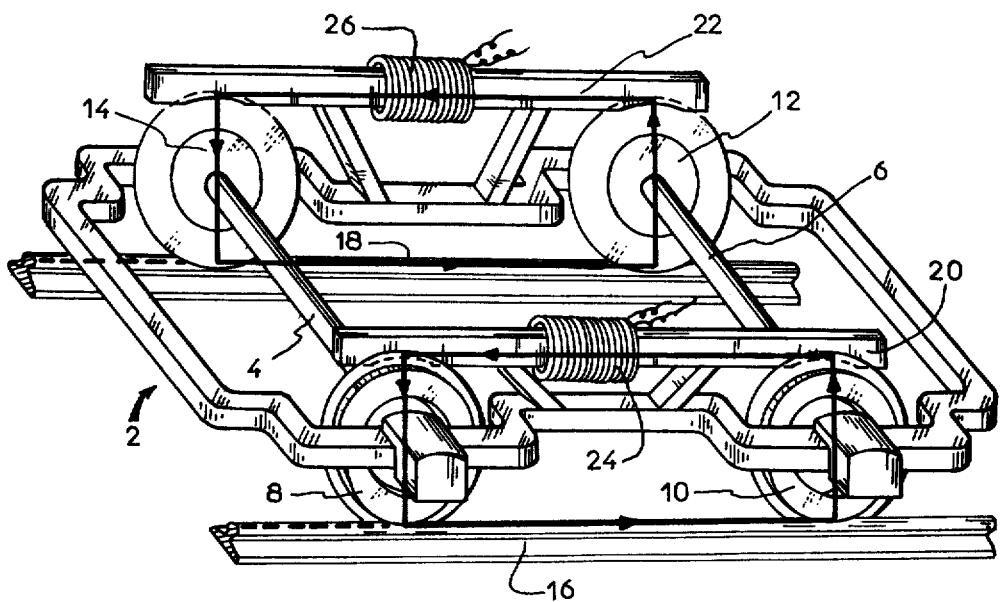
FIG. 1 shows a railway vehicle bogey comprising a braking device in accordance with one form of embodiment of the invention.

The bogey shown in FIG. 1 comprises a chassis indicated as a whole by 2, and on which are mounted two axles 4 and 6 carrying four wheels 8, 10, 12 and 14. The induced circuit is constituted on each side of the vehicle by two wheels 8, 10 and 12, 14 respectively, by the portion of rail comprised between these wheels 16 and 18 respectively, and by an element 20 and 22 respectively parallel to the rails and carrying an excitation winding 24 and 26 respectively.

The rails, the wheels, and the elements 20 and 22 are of magnetic metal. The passage of the induced magnetic flux between the elements 20, 22 and the wheels is effected in the vicinity of these latter across a rotary air-gap. According to this form of embodiment, the axles and the chassis elements other than the elements 20 and 22 are of non-magnetic metal.

The principle of operation of the braking device is as follows:

When the windings 24 and 26 are not traversed by an excitation current, the wheels can rotate freely and there is no opposition to the movement of the vehicle. When an excitation is caused to circulate through the said windings, a magnetic flux is induced in the circuits represented by arrows in FIG. 1. There are thus produced eddy-currents which have a braking effect, while a large magnetic attraction is applied between the wheels and the rails.

Figure 2:
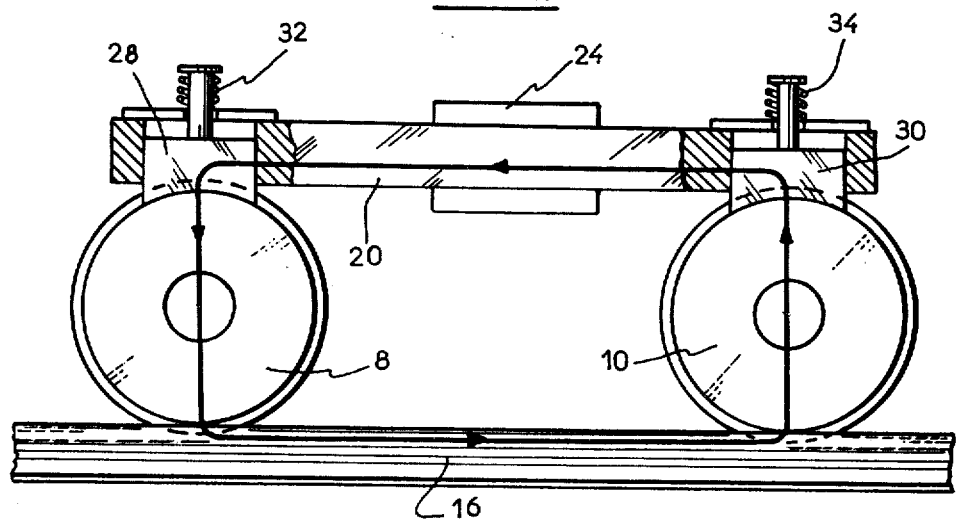
FIG. 2 shows diagrammatically and in cross-section a braking device following an alternative form of the device of FIG. 1.

In FIG. 2, there has been shown diagrammatically and in cross-section, an alternative form of the device previously described. This alternative consists of replacing for each wheel 8, 10, the rotating air-gap by a shoe 28, 30 of friction cast-iron or magnetic material in frictional contact with the rolling surface of the wheel.

An advantageous arrangement consists of embedding these shoes in pairs in the magnetic element 20 parallel to the rails and located above the wheels, in such manner that the excitation of the windings gives rise to a flux through these shoes. Thus, on the one hand the upper half of the wheels is permeated by a magnetic flux and is the seat of additional braking eddy-currents. On the other hand, this flux creates a magnetic attraction between the shoe and the wheel so that an additional effect of braking by friction is created, while the cleaning of the rolling surface is ensured.

It will be understood that suitable means such as springs 32, 34 are arranged in such manner as to lift the shoes away from the wheels after the current has been cut-off.

It is also possible to increase the braking by friction by applying to the shoes an additional force supplied by a pneumatic jack for example (not shown).

In another alternative form of the devices previously described, the rotary air-gap being preferably of the friction type, the respective directions of circulation of the current in the windings are advantageously chosen so that there is no possible magnetic re-closure through the axles or through the cross-members of the bogeys parallel to the axles. In order that the two circuits each located on one side of the bogey may be separate, the direction of circulation of the current in the windings 24 and 26 will advantageously be chosen in such manner that the magnetic fluxes generated in the two wheels 8 and 14 of the same axle 4 are identical in direction.

Figure 3:
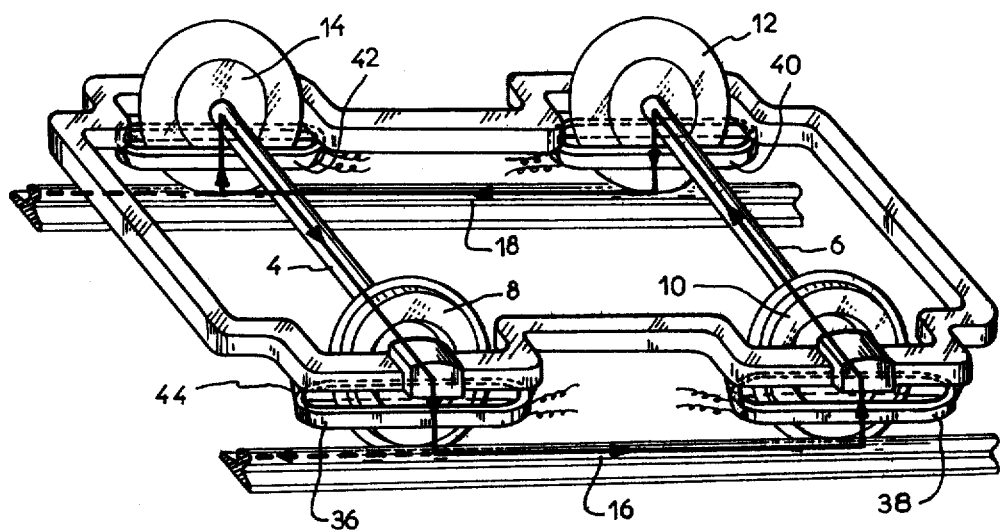
FIG. 3 represents another form of embodiment of the invention.

According to another alternative form shown in FIG. 3, the induced magnetic circuit shown by the arrows is constituted by two pairs of coaxial wheels 8, 14 and 10, 12, the parts of the rails 16 and 18 comprised between the wheels and the axles 4, 6 coupling together the coaxial wheels. In this form of embodiment, the wheels, the axles and the rails are of magnetic metal. The excitation windings 36, 38, 40, 42 are fixed to the chassis by any appropriate means, for example by lugs such as 34, and they are arranged around the lower half of the wheels.

In this arrangement, the respective directions of circulation of the current in the windings are chosen in such manner that the parallel magnetic fluxes generated in two coaxial wheels have a direction such that they do not oppose each other.

Figure 4:
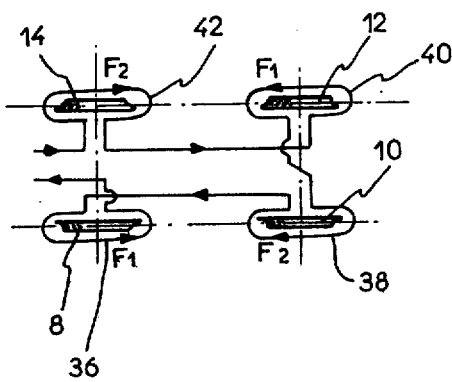
FIG. 4 is an explanatory diagram representing in plan view the four wheels of the bogey surrounded by their four windings of FIG. 3 and the manner in which these windings must be connected for coupling in series.

To this end, and as shown in the diagram of FIG. 4, the windings arranged on the diagonally opposite wheels, namely the windings 36 and 40 for the wheels 8 and 12, are traversed by currents of the same direction $F_1$, while the windings 38 and 42 of the wheels 10 and 14 of the other diagonal are traversed by currents of the same direction $F_2$ with respect to each other but opposite to that $F_1$ of the first diagonal. In addition, it should be noted that the direction of circulation of the current of two windings of two adjacent wheels on the same rail, even if they do not form part of the same bogey, should be contrary.

It will be understood that in the magnetic circuit shown in FIG. 3, the exciting windings may be placed around the axles 4 and 6; this arrangement may be preferred in view of the arrangement of the elements which constitute the bogey.

It will however be observed that the arrangement of the windings around the lower half of the wheels, as shown in FIG. 3, is more advantageous, since it makes it possible to have a better utilization of the whole of the flux created, both for the generation of the braking eddy-currents and for that of the attraction forces between rails and wheels.

In order to indicate the order of magnitude of the braking forces obtained by the devices previously described, reference may be made to the figures below.

In the device shown in FIG. 3, that is to say in which the windings are placed round the wheels, the braking force for one wheel is of the order of 800 kg. for a winding consuming 10 kW and weighing about 50 kg.

According to an alternative form of the invention, the windings may be placed at the same time round the wheels and round the axles.

According to another alternative form (not shown), the magnetic circuit comprises two pairs of coaxial wheels, the rail portions comprised between the said wheels and at least two elements of magnetic metal closing the circuit between the coaxial wheels, these elements being constituted by parts perpendicular to the rails, other than the axles, and of magnetic metal of the chassis or bogey.

Figure 5:
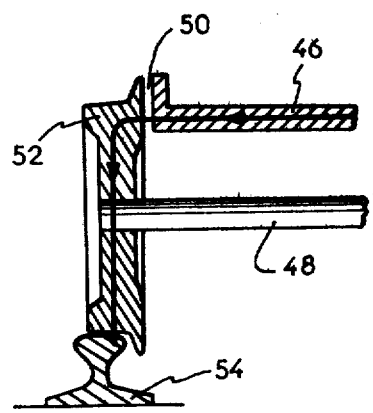
FIG. 5 shows diagrammatically and in detail the passage of the magnetic flux of an element parallel to an axle, to the wheel and to the rail.

In this case, the passage of the magnetic flux from the above-mentioned elements to the wheels is effected across a rotary air-gap. There has been shown diagrammatically in FIG. 5 a part of a device of this kind. The magnetic flux coming in through a cross-member 46 of magnetic metal, parallel to the axle 48 of non-magnetic metal, passes across the air-gap 50 and then penetrates into the wheel 52 and into the rail 54.

It will be understood that without any modification to the conventional construction, the axle boxes and the suspension elements constitute a passage which is relatively poor but which is nevertheless utilizable.

It is also possible to associate with the invention the arrangements generally employed in rotating magnetic machines in order to prevent magnetization of the bearings, for example: interposition of non-magnetic rings, axle boxes of non-magnetic metal, and any means of known type for directing the induced magnetic flux along a preferred direction.

In the particular cases in which the distance between the end axles of two consecutive coaches is smaller than that existing between the two neighbouring axles of the same coach, it will be an advantage to ensure an identical direction of the current for each coach or waggon of all the coaches or wagons of the same train, with respect to the direction of travel.

According to another characteristic feature of the invention which tends to retain the advantages of the disc-brake and to reduce its drawbacks, this system is combined with a dynamic eddy-current braking device without air-gap, by means of an appropriate distribution device for the respective braking orders.

Figure 6:
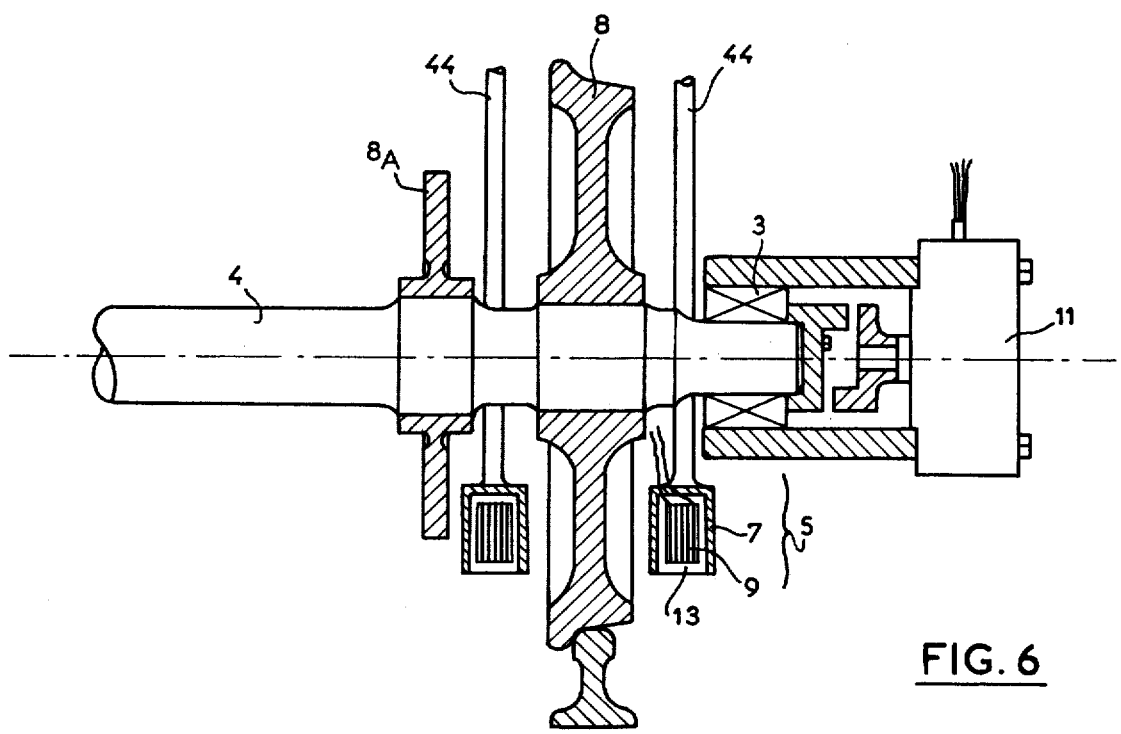
FIG. 6 is a view in partial cross-section through a vertical diametral plane of an axle equipped according to the invention with the combination of a dynamic braking device using eddy-currents and a disc-brake system.

In FIG. 6 which shows a combination of this kind, the half-axle comprises a one-piece wheel 8 of steel hooped on the axle body 4, the stub-axle of which pivots in the bearing 3. A light disc-brake 8A of any known type is hooped on the axle 4, the braking jaws not being shown for the sake of clearness of the drawing. An alternator 11 is coupled on the end of the axle 4. An assembly for the excitation of eddy-currents is shown at 5 and comprises a protecting casing 7 in which is housed a winding 9 constituted by a coil of oxidized aluminium strip, the winding 9 being held inside the casing 7 by means of a filling of resin 13 having good properties of electrical insulation, heat conductivity and mechanical strength.

This resin is preferably made-up of a mixture containing, per 100 parts of hot-polymerizable epoxy type resin, 500 parts of a mineral filler such as finely divided zirconium oxide. The assembly 5 is suspended from the bogey body by means of the suspension arms 44.

Figure 7:
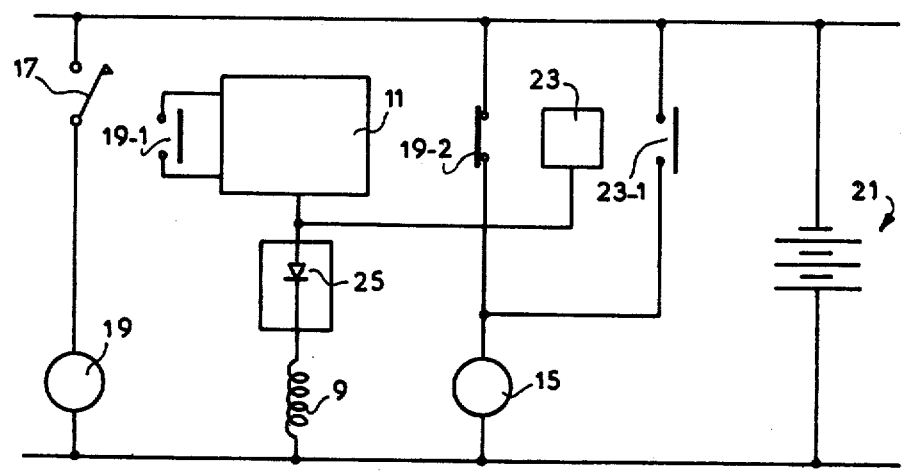
FIG. 7 is a synoptic diagram of one form of possible construction of the control device according to the invention of a vehicle provided with axles in accordance with FIG. 6.

The brake jaws are of the pneumatic pressure emission type and their operating jack is connected to the usual sources of pressure through the intermediary of a control electro-valve, the control winding of which bears the reference 15 in FIG. 7. This electro-valve is of the so-called positive safety type, that is to say it sends the pressure to the brake when its winding 15 is not excited. On the contrary, when 15 is excited, the control jack of the brake is put to the atmosphere and the disc-brake is released.

The diagram of FIG. 7 shows an automatic braking system according to the invention in which the various contacts and relays are shown at rest, the vehicle being stopped and the brakes released. The contact 17 is the brake control contact; it may be shunted by a distance control coming from the driving machine. When it is desired to brake, the contact 17 is closed. The coil of the relay 19 is then supplied by the voltage of the battery 21 located on board the vehicle and known as the lighting battery. The relay 19 rises and closes the contact 19-1 placed in series in the excitation circuit of the alternator 11, which comprises a regulation system of its output current.

If the speed of the vehicle is sufficient, the output voltage of the alternator has a frequency sufficient to cause the operation of the frequency relay 23 which has been pre-set so as to fall back when the frequency, that is to say the speed, falls below a pre-determined value which corresponds to the speed at which the disc-brake must come into operation. The contact 23-1 then closes and maintains the supply to the coil of the electro-valve 15, thus preventing the operation of the disc-brake, although the order for this was given when the relay 19 was operated, opening the contact 19-2. The alternator 11 simultaneously passes a direct current, defined by the regulation, through the rectifier 25, into the excitation winding 9 of the dynamic eddy-current brake so that braking takes place by this means and the speed falls.

When the speed reaches the chosen value, the frequency relay 23 falls back, thus opening the contact 23-1. The coil 15 is then no longer excited and the electro-valve sends the pressure towards the disc-brake which thus comes into action. The rise of pressure is advantageously made gradual by known means, and the assembly of the control jack and brake-jaw levers is provided in such manner that the maximum force available for the full pneumatic pressure does not exceed 80 percent of the force which would in certain cases cause skidding of the wheel.

The alternator 11 continues to deliver its current into the coil 9 up to stopping. During this second braking phase, the retaining force of the dynamic brake falls and disappears at the moment of stopping, while on the contrary the magnetic attraction between wheel and rail increases as and when the ampere-turns of the winding are less and less compensated by those due to eddy-currents. This effect compensates very well for the increase in braking force of the disc-brake in the vicinity of stopping and maintains the ratio of 80 percent previously defined in spite of the increase of friction at low speeds.

When it is desired to start-off again, the contact 17 is opened which causes the relay 19 to fall back and de-excites the alternator 11 through 19-1 which opens and supplies the coil 15 through 19-2 which closes, thus releasing the disc-brake.

It will be observed that in the event of failure to operate of the alternator, liable to cause the non operation of the dynamic brake, the frequency relay 23 cannot operate and the disc-brake is immediately put into action when the contact 17 is closed. As the disc-brake is of light construction, this will result in heavy wear of its lining and high temperature rise of the disc. As this wear is not repetitive, it can be tolerated in view of the safety advantage which it provides.

Figure 8:
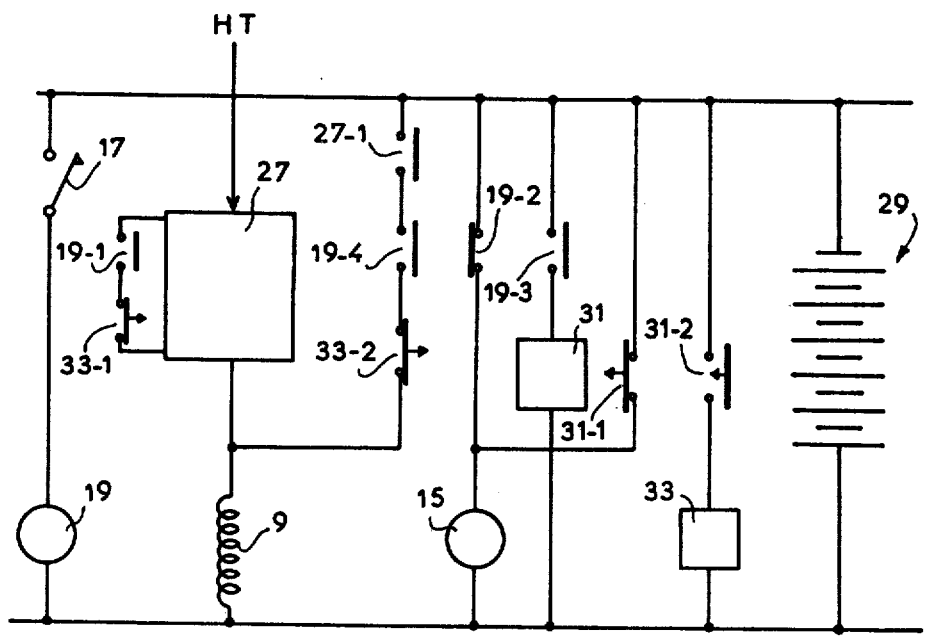

FIG. 8 shows an alternative form of the invention, in which the alternator has been replaced by a static converter-rectifier 27 fed from the high-tension voltage coming from the driving motor, safety being ensured by the stand-by battery 29 capable of supplying the current necessary for at least two stopping operations without re-charging. The two braking phases are delimited by a time-lag relay 31 which brings the disc-brake into service at a pre-determined time after the braking order has been given by closure of the contact 17. The winding 9 of the dynamic brake then remains excited for a time determined by a second time-lag relay 33, this time being sufficient for the vehicle to be stopped.

In case of failure of the converter 27, an incorporated supervisory relay closes the contact 27-1, thus ensuring the excitation of the winding 9 by the battery 29. Apart from these points, the operation is identically the same as that of the automatic system shown in FIG. 7. The time-lag relays 31 and 33 are adjusted in such manner that when the braking is effected from the maximum speed provided for the vehicle, the deceleration of the first phase brings the speed to the value chosen for the coming into action of disc-brakes, for example half the maximum speed, and the time of maintenance of the dynamic braking after the coming into action of the disc-brakes corresponds to a time sufficient to obtain stopping in this case. This method is less flexible than the preceding but it has the advantage over this latter of avoiding a mechanical speed drive. The converter is of course intended to be fed from the various standardized high-tension networks of the railways.

It has previously been seen that the form of embodiment in which the eddy-current braking device according to the invention gave maximum efficiency and effectiveness was that comprising an exciting winding around each wheel. The principle of this has been described with reference to FIG. 3 of the accompanying drawings.

Figure 10:
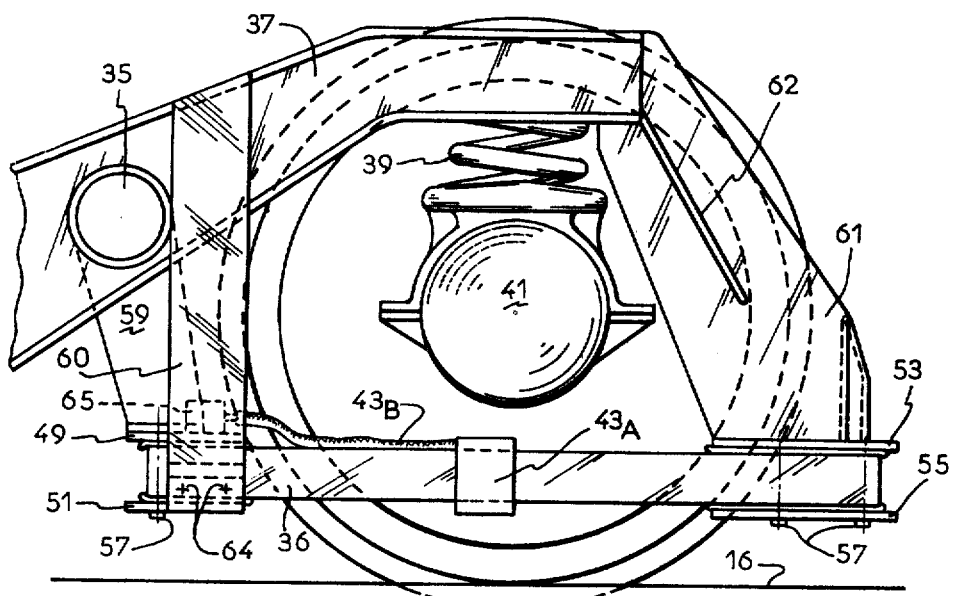
FIG. 10 is a side view of this bogey wheel.
Figure 11:
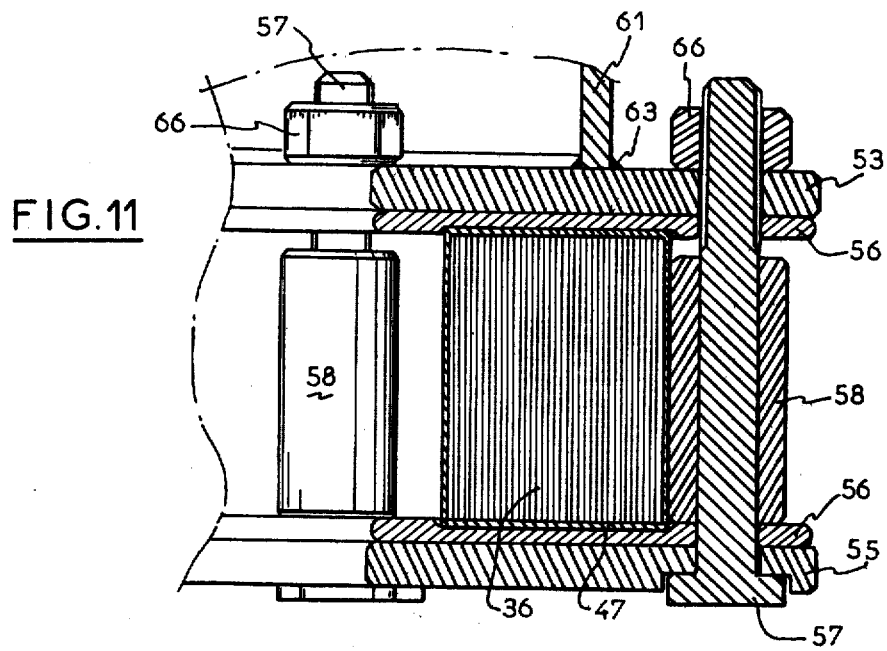
FIG. 11 is a detail view in partial cross-section taken along the line XI—XI of FIG. 9 and to a larger scale.

There will now be described a practical form of embodiment with reference to FIGS. 9, 10 and 11 of the said windings and of their fixing means around the wheels in order that they may be readily removed while being as light as possible.

In the device shown in the said figures, the cross member 35 is welded to the longitudinal member 37, these two members forming part of the bogey body and constituting its suspended armature by means of springs 39 which are supported on the axle-boxes 41 in which pivots the axle 4 and on which are mounted the wheel 8 and the brake-disc 8A. The excitation winding according to the invention is shown at 36; it surrounds the wheel 8 and has a rectangular section; it is constituted by rolled aluminium strip oxidized on its faces and its edges over a small thickness of a few microns, and this strip has been wound on a core-former, each turn being stuck to the previous turn by means of a hot-polymerizable epoxy resin, so that at the end of the winding operation the turns can be clamped to each other by clamps and thus the assembly can be baked, resulting, after baking and removal of the clamps, in a compact and solid winding having the desired shape. The input and output of the winding are effected by means of a strip of copper cold-welded on the aluminium and on which is welded an incoming wire for the current shown at 43B. The aluminium-copper connections are surrounded by a protective hoop 43A.

The winding is enclosed by a casing 47 formed by taping with an insulating canvas impregnated with a mixture of resins and mineral fillers which resist abrasion, this mixture being preferably cold-polymerizable and may be deposited by a brush on the taped winding, this casing ensuring the fluid-tightness and protection of the winding.

The winding 36, which behaves mechanically like a full aluminium ring, is fixed to the bogey by means of metal sheets 49, 51, 53 and 55 which enclose each of its extremities like a sandwich with the interposition of strips of synthetic rubber 56 and clamping by screws 57 about which sleeves 58 of insulating material serve to position the winding 36 in the horizontal plane. The sheet 49 is suspended from the bogey by a sheet 60 welded to the longitudinal member 37. The sheet 53 is suspended from the longitudinal member 37 by a square sheet 61, reinforced by a gusset 62. The sheets 61 and 53 are fixed to each other by a weld 63. The sheet 51 is bent back square at one extremity and is fixed by the screws 64 to the sheet 60.

In order to dismantle an axle, it is therefore only necessary to disconnect the cable 43B from the terminal box 65 and to remove the winding 36 by unscrewing the nuts 66 and the screws 64.

Figure 9:
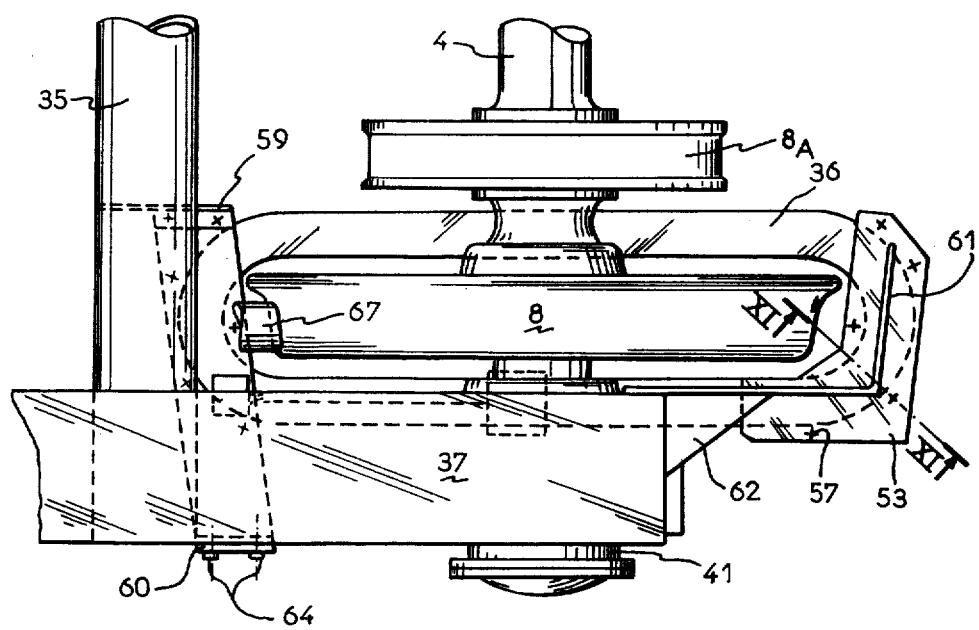
FIG. 9 is a detail view representing a plan view of a bogey wheel mounted and equipped with a winding according to the invention.

It should be noted from FIG. 9 that the wheel passes without dismantling the supports 49 and 53. The screw heads 57 are extra flat and are partly housed in flats formed in the strips 51 and 55, in order to reduce the overall height above the rail 16, imposed by the standard gauge. In certain cases in fact, the user may desire to retain a brake-shoe 67 which prevents 36 from moving too high; the overall vertical dimension of 36 should be as small as possible.

It will be noted that this design of the winding as a self-supporting beam suspended from its extremities only is advantageous as regards weight and overall size, which is also limited in the horizontal plane by the passage between the wheel 8 and the brake-disc 8A, which can advantageously be held in safety.

The diagram of FIG. 14A represents the curve F of a braking operation from 200 km/hr by means only of the windings according to the invention, excited at constant current. It will be noted that the distance travelled before coming to a stop, represented by the value of the shaded surfaces C + D is only 4 percent higher than that represented by the surface C alone, which would have been obtained if the braking had been constant up to the moment of stopping.

This increase is small and is largely compensated by the increase in maximum deceleration which it is possible to apply to the bogey in view of the increase in adhesion and the direct braking by the rail. The curve G of the diagram of FIG. 14B shows the variation of the deceleration during the course of stopping, the residual deceleration being due to the various frictions of a loaded bogey. The gradual disappearance of the deceleration during the second portion of the braking relieves the passengers of the disagreeable sensation of jolts.

FIG. 15 shows at E that the period of gradual diminution of the deceleration is adapted to the maximum value of the deceleration and that this maximum value is substantially proportional to the value of the current I, even for high values such as 1.2 m/s/s/

FIG. 16 shows at H the variation of the temperature rise of the windings during the course of braking to a stop effected from 200 km/hr with various intensities, it being understood that the times required for stopping increase when I diminishes.

Figure 13:
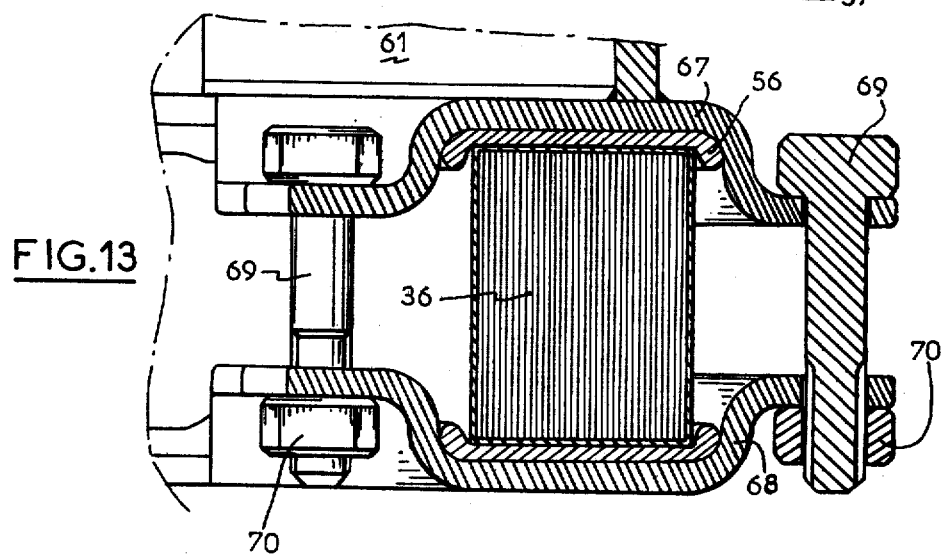
FIG. 13 is a detail view in partial cross-section taken along the line XIII—XIII of FIG. 12 and to a larger scale.
Figure 12:
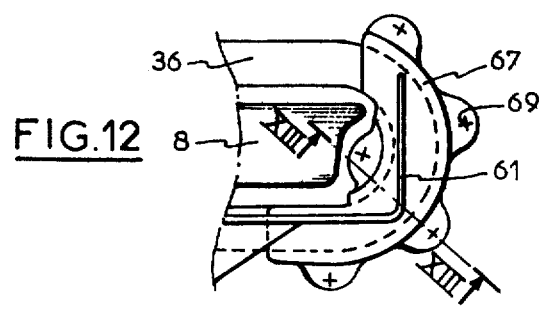
FIG. 12 is a detail view representing an alternative form of fixing of the winding, to a smaller scale.

FIGS. 12 and 13 show an alternative method of fixing of the coil 36 which enables the overall vertical dimension to be reduced. The strips 67 and 68 are in this case stamped out and are provided with lugs in which are threaded screws 69 the nuts 70 of which can be removed from underneath. For the remainder the fixing is the same as that of the previous form of construction. This alternative form offers the further advantage of better protection of the coil against wet or other projections which take place mainly in the plane of the wheel, by enclosing the exposed extremities in a kind of casing.

The dynamic eddy-current braking device according to the present invention may be utilized as the main brake on all railway vehicles in which a source of electric current is available, whether this is taken off by a collector shoe or whether it is derived from an electric machine on board the vehicle. When the electric current is obtained from the driving vehicle to the drawn vehicle, an automatic system known per se detects the voltage failure caused by a brake in the coupling and actuates the braking by switching the windings to the terminals of a stand-by battery on board each vehicle. In this case, it may happen that the voltage coming from the driving machine is higher than that of the battery. In order to avoid the use of an electronic voltage converter on board each trailer vehicle, the present invention proposes to adapt the voltage of the windings by a series or parallel combination of the eight windings of a vehicle with two bogeys.

Thus, in order to supply the brakes from the 110 V battery, all the coils are connected in parallel, which results in the braking being obtained with a voltage of 110 V at the terminals of each coil. Furthermore, the change-over switching is effected in such manner that the directions of the current in the coils are in conformity with those of FIG. 4, that is to say on one bogey, the windings arranged on the diagonally opposite wheels are traversed by currents of the same direction and those of the other diagonal are traversed by currents having the same direction with respect to each other but contrary to that of the first diagonal.

In addition, the direction of circulation of the current of two windings or two adjacent wheels on the same rail, even if they do not form part of the same bogey, must be contrary. In order to supply the same brakes from the hightension of 1,500 V, all the coils are switched in series, that is to say the voltage necessary for braking at the terminals of the whole unit becomes 880 V. It is then possible to drop the excess 620 V in a resistance which will advantageously form part or the whole of the heating resistances. In this case of course, the directions specified above are respected. When it is not possible to arrange a battery on board each vehicle, a second so-called emergency braking system is provided which is brought into action by the breaking of the coupling.

On the other hand, when each vehicle is provided with a battery comprising a constant re-charging system, as is the case to-day, it is clear that the braking device according to the invention can operate in a normal manner on the said battery.

It is of course easy to adapt the construction of the windings to a given voltage by choosing the thickness of the aluminium strip as a function of the inverse ratio of the voltage and by keeping its width constant. By means of the method of winding with glueing of the turns to each other, the mechanical strength of the coil is not affected by the change in voltage. This would not be the case if the coil were made from wire, and in this case it would be necessary to support the coil by a stiff frame.

In particular, when the coil is made from copper wire, for a consumption of excitation power identical with that of the coil of aluminium strip, its weight is substantially twice that of this latter. The result is that the forces due to the accelerations are doubled, while those due to the braking reactions remain unchanged. Since the mechanical strength of such a coil is bad, even when it is correctly impregnated, it becomes necessary to support it over its whole length by stiffeners which are of light metal, aluminium for example, in order to increase the weight as little as possible. These stiffeners do not take any part in the production of the ampere-turns and therefore constitute a dead weight and a useless additional bulk.

In order to clearly understand the importance of the mechanical strength of the coil, it is important to consider that the reaction forces of the eddy-currents arise in the coil itself and that they are of the order of magnitude of a ton (10,000 Newton). These forces, the direction of which is substantially parallel to the rails, must be transmitted to the frame of the bogey by means of the coil, its attachments and its supports, which makes it necessary to devote special attention to the design of these parts.

In order to avoid in normal working the drag due to the remanent magnetism of the axles, it is useful to demagnetize them after use of the brake by any known method, the simplest consists of causing a direct current to circulate in the braking coils in a direction opposite to that chosen for the braking and the intensity of which, lower than that of the braking, is determined as a function of the magnetic characteristics of the axles. This operation, of short duration, follows each braking operation, preferably automatically.

It will of course be understood that the application of the present invention is not limited to bogey vehicles and may be extended to vehicles with two axles by simple transposition of the arrangements, following the rules of the art.

I claim:

1. A device for the dynamic eddy-current braking of vehicles moving on rails of magnetic metal, and in which the wheels are also of magnetic metal, said device comprising:

at least two pairs of coaxial wheels with axles of magnetic metal;

as many excitation windings as there are coaxial wheels, each of said windings being mounted with a continuous clearance and surrounding the lower half of each of said wheels;

an induced magnetic circuit constituted by said lower halves of said two pairs of coaxial wheels, the portions of rail comprised between said wheels and the two axles of said wheels;

means for creating a magnetic flux through the intermediary of said windings, constituted by a source of electric current and a supply system for said coils with direct current from said source, comprising a switch;

and means for connecting to each other said windings of said two pairs of coaxial wheels, in order that in each vehicle said continuous current always circulates in the same direction in the windings surrounding the diagonally opposite wheels and always circulates in opposite directions in the windings surrounding said coaxial wheels;

whereby a magnetic flux adapted to generate effective retarding eddy-currents in said wheels and said rails is created at the required moment by closing said switch of said supply system for the windings and the various vehicles may be coupled together automatically in any direction whatever.

2. A braking device as claimed in claim 1, in which each said winding is constituted by a helix of elongated shape comprising a plurality of turns of electrically conductive metal and is rigidly fixed to the chassis or armature of a vehicle bogey by attachments fixed on the one hand solely to each of the extremities of said winding, and on the other hand to said chassis or said armature, by supports of which the horizontal section has a greater mechanical inertia in the direction parallel to said rails than in the direction perpendicular thereto.

3. A braking device as claimed in claim 2, in which said winding is constituted by a coil of concentric turns of rolled and oxidized aluminium strip, said turns being glued to each other by the interposition at the time of winding of a glue on their opposite faces, whereby, after drying and/or baking of said glue, said winding constitutes a rigid ring, the main strength of which lies in the conductive metal itself.

4. A braking device as claimed in claim 2, in which said attachments are each constituted by an upper part and a lower part, at least one of which is substantially in the shape of a gutter, which receive the extremities of said winding like a sandwich with the interposition of a thickness of elastic material, said lower portion being removably mounted so as to permit removal of said winding, by means of fixing bolts of which the vertical dimension downwards is at most equal to that of said parts assembled on said winding, while said upper portion does not interfere with the removal of said wheel.

5. A braking device as claimed in claim 1, and further comprising means for ensuring the de-magnetization of said wheels and said axles after interruption of the main excitation current of said windings, said means comprising a voltage-reversing device at the terminals of said windings and a source of low tension.

6. A device for dynamic eddy-current braking of vehicles moving on rails of magnetic metal and in which the wheels are also of magnetic metal, said device comprising:

at least two pairs of coaxial wheels with axles of magnetic metal;

as many excitation windings as there are coaxial wheels, each of said windings being mounted with a continuous clearance and surrounding the lower half of each of said wheels;

an induced magnetic circuit constituted by said lower halves of said two pairs of coaxial wheels, the portions of rail comprised between said wheels and the two axles of said wheels;

means for generating a magnetic flux through the intermediary of said windings, constituted by a source of electric current and a supply system for supplying said windings with continuous current from said source, comprising a switch;

means for connecting to each other said windings of said two pairs of coaxial wheels, so that, in each vehicle, said continuous current always circulates in the same direction in the windings surrounding the diagonally opposite wheels, and always circulates in opposite direction in the windings surrounding said coaxial wheels;

a disc-brake system of a solid friction type;

and operating means in order that the braking order for obtaining normal stopping of said vehicle first of all puts into service the eddy-current braking device and then the disc-brake system only.

* * * * *